Oct. 4, 1927. 1,644,589
R. P. HERON
LIQUID MEASURING DEVICE
Filed April 27, 1923 2 Sheets-Sheet 2
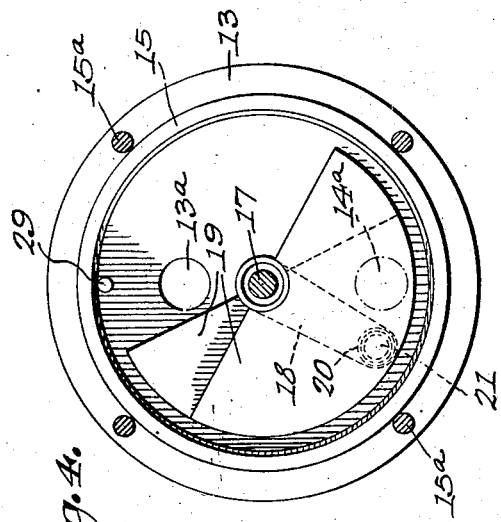
Fig. 4.
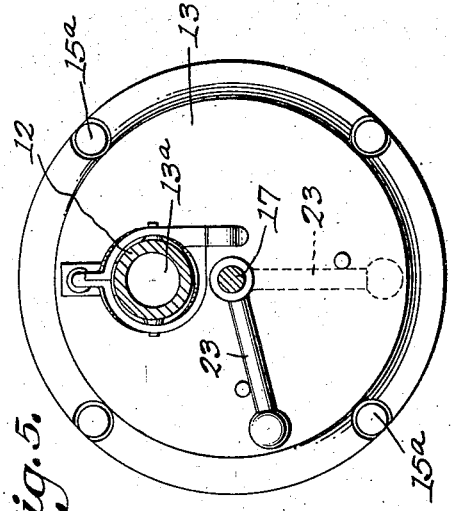
Fig. 5.
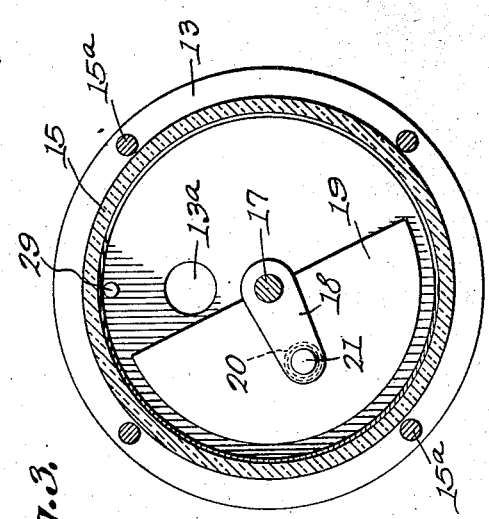
Fig. 3.
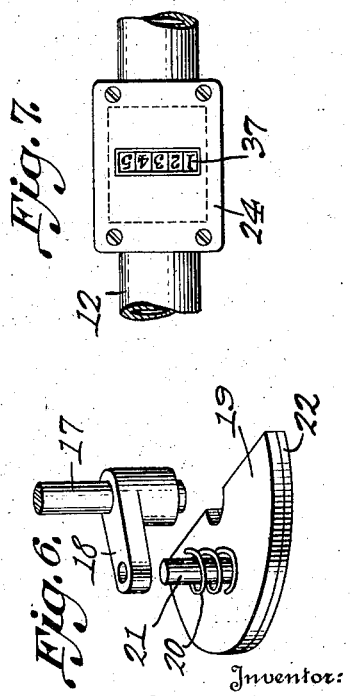
Fig. 7.
Fig. 6.
Inventor:
Robert P. Heron,
By (signature)
Attorneys.

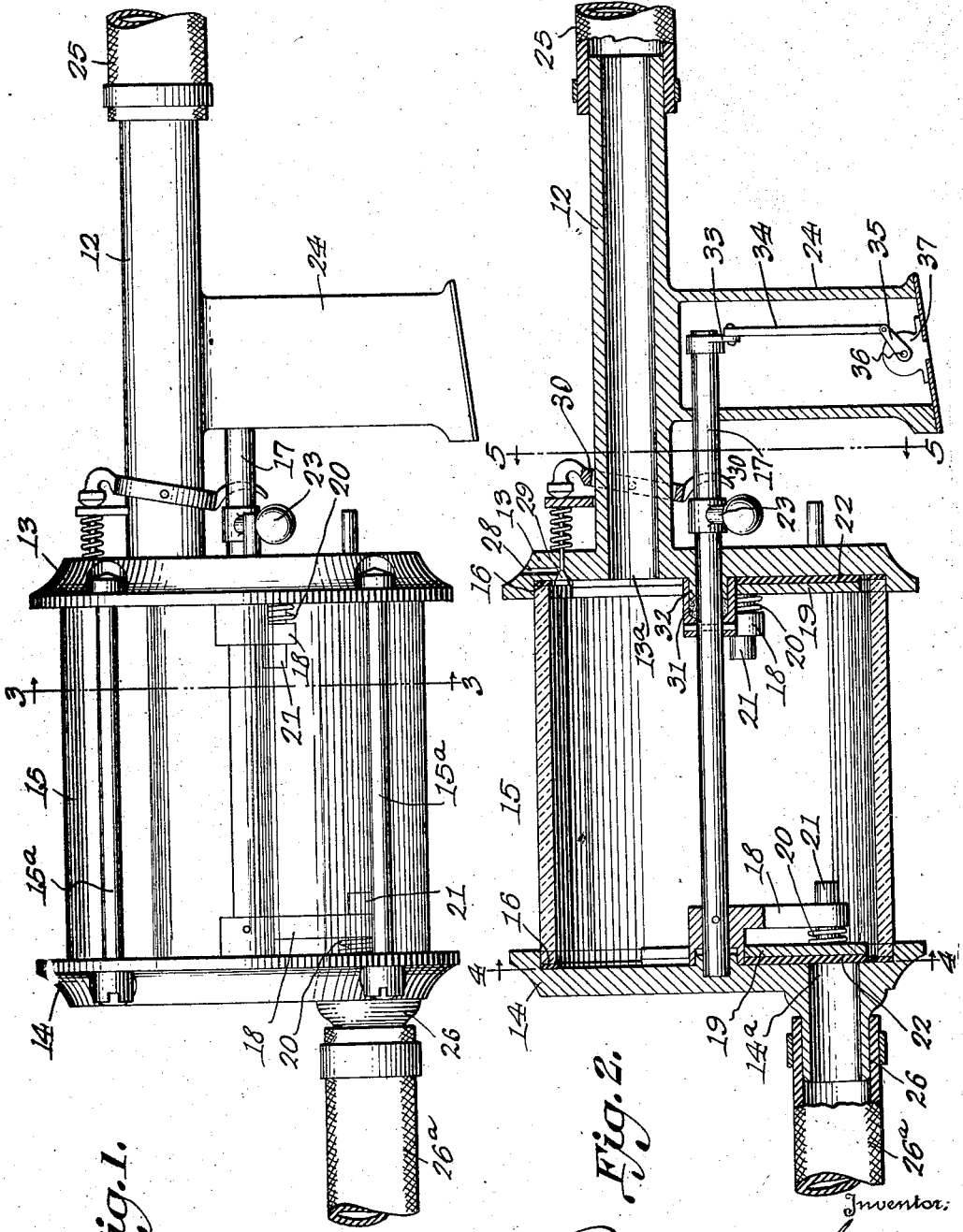

Patented Oct. 4, 1927.

1,644,589

UNITED STATES PATENT OFFICE.

ROBERT P. HERON, OF UTICA, NEW YORK; JOSEPH PICKELL ADMINISTRATOR OF SAID ROBERT P. HERON, DECEASED.

LIQUID-MEASURING DEVICE.

Application filed April 27, 1923. Serial No. 635,005.

This invention has for its object to provide a simple and convenient visible measuring and dispensing device for oil, gasoline or other liquids, so that a buyer may be certain that he is getting full measure of the liquid which he is ordering. To this end the invention, in its preferred form, comprises a receptacle having a glass body mounted between suitable metal heads one of which is provided with an inlet port and the other with an outlet port, these ports being out of register with each other. Journalled in the said metal heads is a rock-shaft to which are connected segmental valve members yieldingly pressed against the inside walls of the said heads and so arranged that when the inlet port is opened the outlet port will be closed, and vice versa. The said rock-shaft is provided with a suitable arm or handle by which it may be manually operated. Communicating with the inlet port is a pipe preferably provided with a pistol grip handle by which the measuring device may be held by the user, the said pipe being in practice connected with a flexible hose extending to a barrel or other suitable container from which the oil or other liquid is to be drawn. The outlet head of the measuring device is provided with a suitable spout through which liquid is discharged from the measuring chamber into a storage tank or receptacle into which the measured fluid is to be run. The measuring device is provided with an air inlet and outlet port adapted to be closed by a spring-pressed valve, and which valve will be manually displaced from its seat to open the said port when the measuring chamber is to be filled or emptied. A registering device is preferably located in the pistol grip handle and operatively connected with the rock-shaft so that the number of times that the measuring device is filled and emptied will be indicated by the registering device.

In the accompanying drawings Fig. 1 is a side view of the improved measuring device, and Fig. 2 is a central longitudinal section thereof. Fig. 3 is a transverse section on line 3—3, Fig. 1. Fig. 4 is a sectional end view on line 4—4, Fig. 2. Fig. 5 is an end view partly in section on line 5—5, Fig. 2. Fig. 6 is a detail view of one of the segmental valves and co-operating parts. Fig. 7 is a detail view to show the register.

Referring to the drawings, 12 denotes an inlet pipe preferably cast integral with the inlet head 13 of the measuring chamber, and between which inlet head and the outlet head 14 is interposed a casing part preferably consisting of a glass cylinder 15 held in place between the said heads by suitable bolts 15ª which serve as connections between said heads. Liquid-tight joints between the said glass cylinder and the said heads are preferably provided by means of suitable packing rings 16 against which the said heads are tightly held by the said bolts 15.

Journalled in the heads 13 and 14 is a rock-shaft 17 provided with arms 18, and engaging the hubs of the said arms and oscillating with said rock-shaft are segmental valves 19 pressed against the inner walls of said heads by springs 20 interposed between the said arms and the said valves. The springs 20 encircle pins 21 connected with the said valves 19 and with the said arms 18, so that as the said rock-shaft is turned more or less the said segmental valves will move with it to open and close the inlet and outlet ports 13ª and 14ª with which the heads 13 and 14 are provided and which ports are so arranged, by being out of register with each other, that when one is open the other will be closed. Said segmental valves, as herein shown, are of sufficient extent so that if not given their full movements both ports may be closed, as may sometimes be desirable to retain the liquid temporarily when the chamber of the measuring device is filled. The said segmental valves 19 are faced with some suitable soft material 22, as asbestos, leather, or the like, in contact with the inner walls of the said heads, so that they will tightly close the said inlet and outlet ports when desired. A packing washer 31 may be interposed between the hub of an arm 18 and a boss 32 on the head 13 to make a tight joint at the bearing of the rock-shaft 17 in said head.

Attached to the rock-shaft 17 is an arm or handle 23 by which the shaft may be rocked in opening and closing the inlet and outlet ports. Preferably cast integral with the inlet pipe 12 is a hollow pistol grip handle 24 by which the measuring device may be conveniently held by the user. The rock-shaft 17 is extended into the said hollow handle 24 and is provided, within said handle, with an arm 33 connected by a link 34 with an arm 35 on a shaft 36 of a counting register 37 which may be of any well-known form and by which the number of times that the device is filled and emptied may be recorded.

The pipe 12 is to be connected with the barrel or other source of supply of the liquid to be measured, by a flexible pipe or tube 25, which may be of metal, rubber or other suitable material.

In the use of the invention the flexible hose or tube 25 will be extended to a suitable supply container, as a tank or barrel, which may be elevated so that the liquid may run into the chamber of the measuring device by gravity, and may be discharged by gravity; but the liquid will preferably be forced from the container by air pressure in the oil barrel or other container. When the inlet port is opened by a suitable manual manipulation of the rock-shaft 17 through the arm or handle 23 attached thereto, and at which time the outlet port will be closed, the measuring chamber will be filled with liquid, an air inlet and outlet port 28 on the inlet head 13 and controlled by a spring-retracted valve 29, being at this time held open manually, by the manipulation of a pivoted trigger device 30, for the escape of air from the measuring chamber. When the measuring chamber has been filled, as may be readily determined through the glass cylinder 14ª or other transparent wall thereof, the rock-shaft 17 will be manipulated to close the inlet port and open the outlet port, and the liquid may then be permitted to run by gravity through a spout 26, communicating with the outlet port, and a hose or flexible pipe 26ª, to a suitable receiving tank or receptacle which may be the usual oil or gasoline tank of a motor vehicle. In thus discharging the liquid from the chamber of the measuring device the air valve 29 will be held open manually for the admission of air to the measuring chamber, as will be understood.

The improved measuring, registering and dispensing device, which may be of any desired capacity, is primarily intended for use in measuring lubricating oil at service stations, being more particularly useful in measuring heavy liquids supplied through a flexible tube. If oil were to be dispensed through a flexible tube of much length after being measured a considerable amount of such measured oil would adhere to the inside of the tube, and the purchaser would therefore fail to get full measure; but by placing the visible measuring device at the end of a supply tube, and discharging the liquid into a tank or receptacle of a motor car after the liquid has been measured the purchaser is assured of getting full measure.

The invention affords convenient means for quickly serving customers with lubricating oil at a supply station for the reason that when the outlet port of the measuring chamber is closed the inlet port, communicating with the source of supply through the flexible tube 25, is open, and as the measuring device may, in practice, be kept detached from the oil barrel or supply container it may always be full in readiness to be quickly discharged and may, of course, be quickly refilled, in supplying a purchaser with any desired amount. When not in use the measuring device may be hung up by the handle or otherwise on a nail or hook, with the discharge spout 26 upward, so that there will be no drip from said spout.

It will thus be seen that the invention provides a simple and convenient visible measuring, dispensing and recording device for oil and other liquids and which device is adapted to be rapidly filled and emptied. Also it will be understood that the invention is not limited to the details of construction shown and described, and that such details may be varied widely, within the province of mechanical skill, without departing from the scope of the invention as defined by the claims hereunto appended.

Having thus described my invention I claim and desire to secure by Letters Patent:

1. A visible liquid measuring device comprising an inlet head provided with an inlet pipe and port and an outlet head provided with an outlet port and nozzle, said inlet and outlet ports being out of register with each other, a transparent casing part interposed between said heads, packings to afford tight joints between said heads and said transparent casing part, bolts connecting said heads and serving to hold them tightly against said packings, a rock-shaft mounted in said heads and provided with an operating handle outside of said heads, arms attached to said rock-shaft and having holes, segmental valves having pins loosely entering holes in said arms, whereby said valves are connected with said rock-shaft to rotate therewith but are loose so as to be free to move in the direction of the axis of said rock-shaft, and by which valves the said inlet and outlet ports may be alternately opened and closed, and springs by which said valves are yieldingly held against said heads.

2. A portable visible liquid measuring device comprising an inlet head provided with an inlet pipe and port and an outlet head provided with an outlet port and spout, a transparent casing part interposed between said heads, suitable packings to afford liquid-tight joints between said heads and said transparent casing part, bolts connecting said heads and serving to hold them tightly against said packings, a rock-shaft mounted in said heads and provided with an operating handle outside of said heads, segmental valves loosely supported on said rock-shaft but connected thereto so as to rotate therewith, and by which valves the said inlet and outlet ports may be opened and closed, springs by which said valves are pressed against said heads, one of said heads being provided with an air inlet and outlet port, a handle by which the measuring device may be conveniently held, a spring-retracted valve controlling said last-named port, and a finger lever for opening said valve, said lever being located adjacent said handle.

3. A visible liquid measuring and dispensing device having inlet and outlet ports and alternately opening and closing valves for controlling said ports, combined with a rock-shaft by which said valves may be operated, and a register operatively connected with said rock-shaft, said device being provided with a hollow handle in which said register is mounted.

4. A portable visible liquid measuring and dispensing receptacle having inlet and outlet ports and alternately opening and closing valves for controlling said ports, combined with a rock-shaft by which said valves may be operated, and a register operatively connected with said rock-shaft, said device being provided with a handle by which it may be held by the user, said device being also provided with an air inlet and outlet port, a flexible tube to connect said inlet port with a source of supply, a spring-retracted valve for closing said last-named port, and an operating finger lever located adjacent said handle and by which said last-named valve may be conveniently opened.

5. A portable liquid measuring and dispensing device comprising an inlet head provided with an inlet pipe and port, and an outlet head provided with an outlet port and spout, a transparent casing part interposed between said heads, suitable packings to afford liquid-tight joints between said heads and said transparent casing part, bolts connecting said heads and serving to hold them tightly against said packings, a rock-shaft mounted in said heads and provided with an operating handle outside said heads, segmental, soft-faced, spring-pressed valves connected with said rock-shaft so as to rotate therewith and by which valves the said inlet and outlet ports may be alternately opened and closed, and a register operatively connected with said rock-shaft to record the nnmber of times the measuring and dispensing device is filled and emptied.

In testimony whereof I affix my signature.

ROBERT P. HERON.